US008312456B2

(12) United States Patent
Hepkin et al.

(10) Patent No.: US 8,312,456 B2
(45) Date of Patent: Nov. 13, 2012

(54) SYSTEM AND METHOD FOR OPTIMIZING INTERRUPT PROCESSING IN VIRTUALIZED ENVIRONMENTS

(75) Inventors: David Alan Hepkin, Austin, TX (US); Sujatha Kashyap, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 12/129,808

(22) Filed: May 30, 2008

(65) Prior Publication Data

US 2009/0300317 A1    Dec. 3, 2009

(51) Int. Cl.
G06F 9/46 (2006.01)
G06F 15/173 (2006.01)
(52) U.S. Cl. ........ 718/100; 718/102; 718/104; 718/105; 709/223; 709/224; 709/226
(58) Field of Classification Search .............. 718/1, 104, 718/105; 710/260, 266
See application file for complete search history.

(56) References Cited

U.S. PATENT DOCUMENTS

| | | | | |
|---|---|---|---|---|
| 6,957,435 | B2 * | 10/2005 | Armstrong et al. | 718/104 |
| 6,986,137 | B1 | 1/2006 | King et al. | 709/100 |
| 7,080,378 | B1 * | 7/2006 | Noland et al. | 718/104 |
| 2002/0099753 | A1 * | 7/2002 | Hardin et al. | 709/1 |
| 2004/0205272 | A1 * | 10/2004 | Armstrong et al. | 710/260 |
| 2005/0138422 | A1 * | 6/2005 | Hancock et al. | 713/201 |
| 2006/0048160 | A1 * | 3/2006 | Olszewski et al. | 718/105 |
| 2006/0101470 | A1 * | 5/2006 | Swanberg | 718/105 |
| 2006/0195644 | A1 * | 8/2006 | Arndt et al. | 710/260 |
| 2006/0206887 | A1 * | 9/2006 | Dodge et al. | 717/161 |
| 2006/0230400 | A1 * | 10/2006 | Armstrong et al. | 718/1 |
| 2007/0061441 | A1 * | 3/2007 | Landis et al. | 709/224 |
| 2007/0067366 | A1 * | 3/2007 | Landis | 707/205 |
| 2007/0067435 | A1 * | 3/2007 | Landis et al. | 709/224 |
| 2008/0077927 | A1 * | 3/2008 | Armstrong et al. | 718/104 |
| 2008/0082977 | A1 * | 4/2008 | Araujo et al. | 718/1 |
| 2009/0024994 | A1 * | 1/2009 | Kannan et al. | 718/1 |

FOREIGN PATENT DOCUMENTS

| | | | |
|---|---|---|---|
| JP | 2001147824 | A | 5/2001 |
| JP | 2005018560 | A | 1/2005 |
| JP | 2006059052 | A | 3/2006 |

OTHER PUBLICATIONS

"CPU time accounting," Linux on System Z. IBM.com, http://www.ibm.com/developerworks/linux390/perf/tuning_rec_CPUtimes.html, retrieved on May 28, 2008.
International Search Report and Written Opinion for Application PCT/EP2009/056203, mailed Sep. 1, 2009, 10 pages.

* cited by examiner

Primary Examiner — Emerson Puente
Assistant Examiner — Charles Swift
(74) Attorney, Agent, or Firm — David A. Mims, Jr.; VanLeeuwen & VanLeeuwen (57) ABSTRACT

An approach is provided that retrieves a time spent value corresponding to a selected partition that is selected from a group of partitions included in a virtualized environment running on a computer system. The virtualized environment is provided by a Hypervisor. The time spent value corresponds to an amount of time the selected partition has spent processing interrupts. A number of virtual CPUs have been assigned to the selected partition. The time spent value (e.g., a percentage of the time that the selected partition spends processing interrupts) is compared to one or more interrupt threshold values. If the comparison reveals that the time that the partition is spending processing interrupts exceeds a threshold, then the number of virtual CPUs assigned to the selected partition is increased.

17 Claims, 6 Drawing Sheets

SYSTEM AND METHOD FOR OPTIMIZING INTERRUPT PROCESSING IN VIRTUALIZED ENVIRONMENTS

BACKGROUND OF THE INVENTION

1. Technical Field

The present invention relates to virtualized environments. More particularly, the present invention relates to an approach for optimizing the processing of interrupts in virtualized environments.

2. Description of the Related Art

Virtual I/O (VIO) server partitions provide a mechanism for sharing physical devices across logical partitions. They provide a specialized service, and have unique computing requirements when compared to "general" logical partitions. Computation on VIO servers is largely driven by external interrupts, and minimizing the latency of processing each interrupt is a pressing concern. Service time can be reduced by increasing the amount of computing resources (processing capacity) assigned to the logical partition.

In lieu of the system administrator actually assigning more computing capacity to the partition, another existing means of doing so is to "uncap" the partition. Uncapping a partition allows each of the partition's virtual CPUs to potentially consume up to a full physical processor's worth of processing capacity. That is, if a partition has 2 virtual CPUs then, in uncapped mode, it can consume up to (and no more than) 2 physical processors' worth of computing capacity. Each logical partition requests a "guaranteed" or "entitled" processing capacity, which is a (system-administrator-configured) fraction of the total number of physical processors on the server.

There is significant merit to keeping the number of virtual CPUs of a logical partition down to the minimum required to satisfy the partition's entitled processing capacity. Fewer virtual CPUs reduce the context-switch overheads of swapping multiple virtual CPUs (vCPUs) in and out of the physical processors. Also, fewer vCPUs result in less lock contention in SMP environments. A feature known as CPU folding attempts to enforce this heuristic, by collapsing capacity into the fewest number of vCPUs. CPU folding can result in increased interrupt service latencies on uncapped partitions, because it reduces the maximum processing capacity achievable by the partition by restricting the number available free cycles that the partition can consume. For example, an uncapped partition with two vCPUs and total assigned capacity of 0.4 processors could, in the absence of CPU folding, potentially consume up to two full physical CPUs' worth of processing capacity. CPU folding might result in collapsing this partition into a single vCPU with a processing capacity of 0.4, thereby reducing its maximum potential processing capacity to 1 physical CPUs' worth. Naturally, CPU folding mechanisms have algorithms that increase or decrease the number of virtual processors employed over time. Ideally, these algorithms can be conservative, so that the number of virtual processors does not vacillate unnecessary.

A challenge of traditional CPU folding mechanisms is that they use algorithms with longer periodicity than required for interrupt processing. These two requirements (reduced interrupt service latency, and reducing the number of vCPUs) are in opposition to each other, especially in interrupt-heavy environments.

SUMMARY

It has been discovered that the aforementioned challenges are resolved using an approach that retrieves a time spent value corresponding to a selected partition that is selected from a group of partitions included in a virtualized environment running on a computer system. The virtualized environment is provided by a Hypervisor. The time spent value corresponds to an amount of time the selected partition has spent processing interrupts. A number of virtual CPUs have been assigned to the selected partition. The time spent value (e.g., a percentage of the time that the selected partition spends processing interrupts) is compared to one or more interrupt threshold values. If the comparison reveals that the time that the partition is spending processing interrupts exceeds a threshold, then the number of virtual CPUs assigned to the selected partition is increased.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
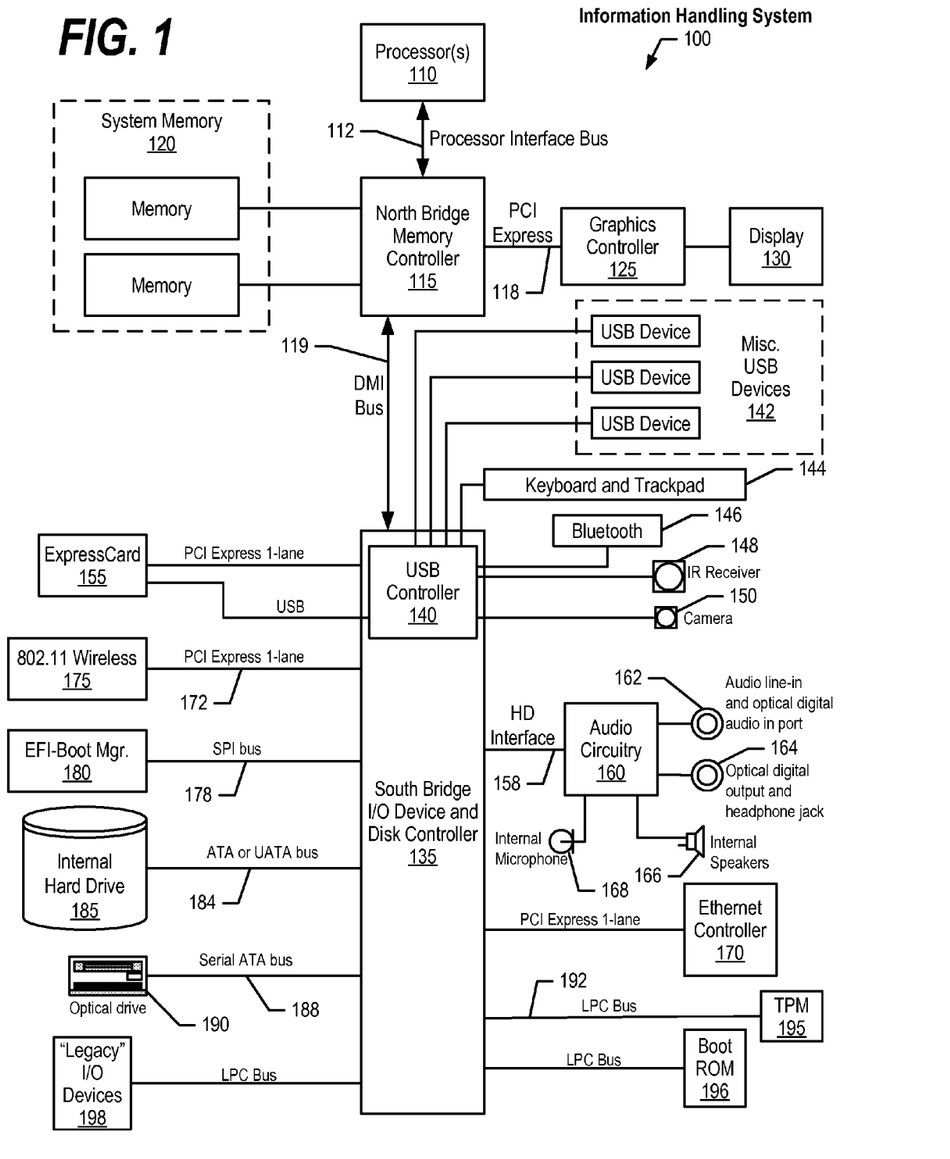
FIG. 1 is a block diagram of a data processing system in which the methods described herein can be implemented.
Figure 2:
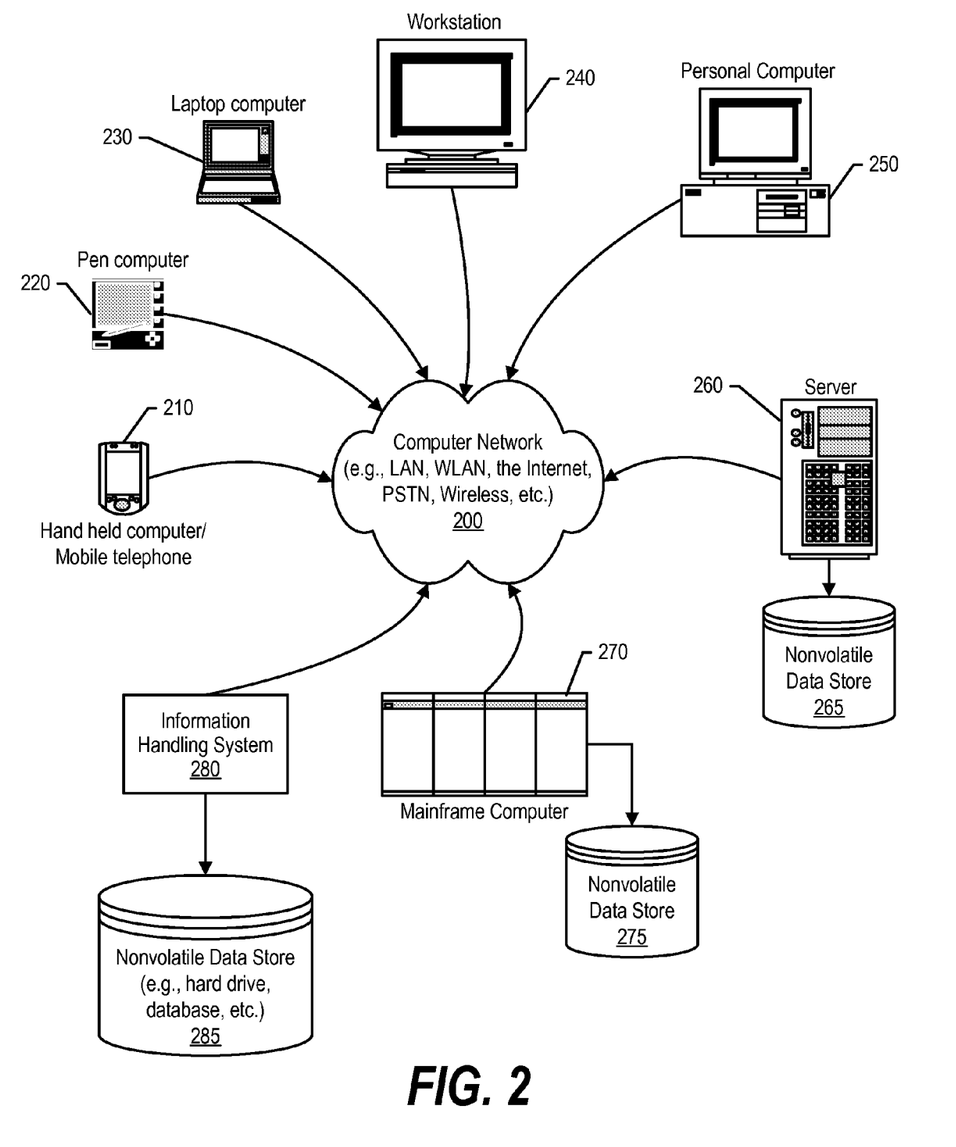
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
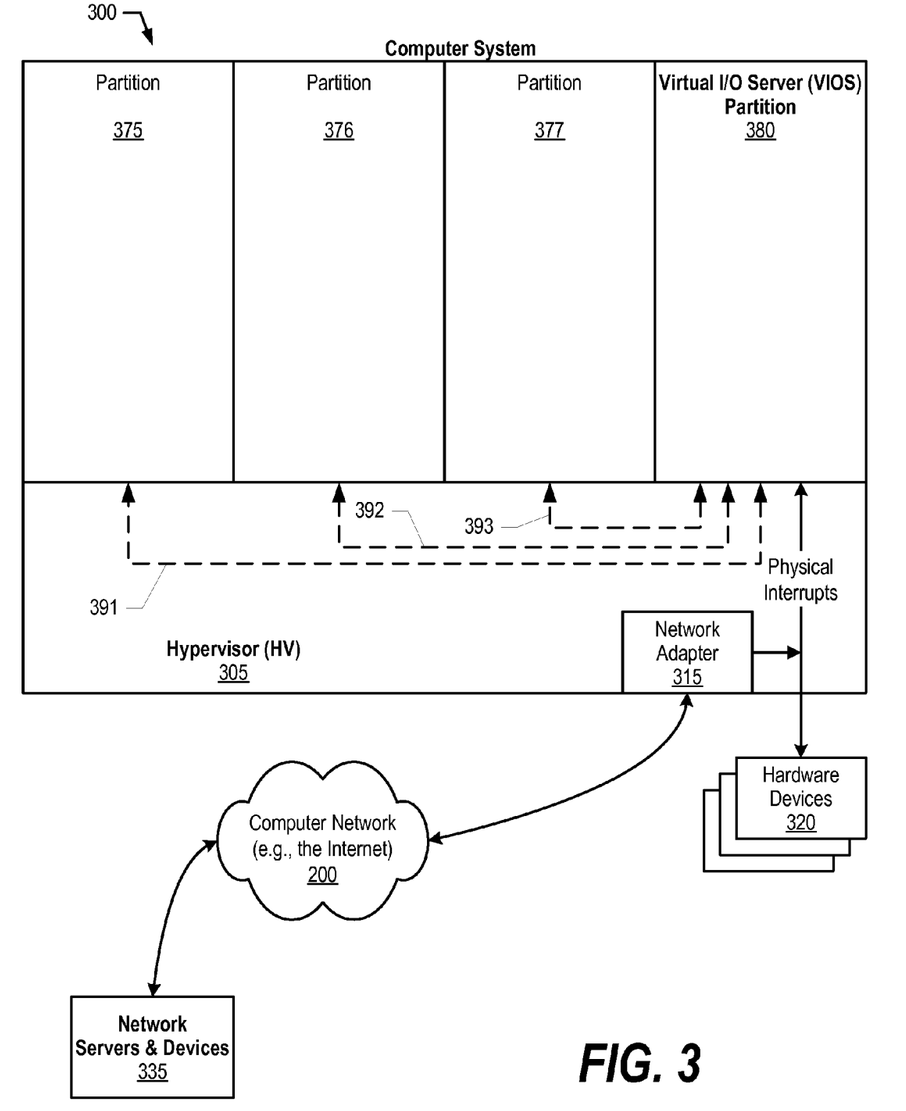
FIG. 3 is a diagram of a computer system using a virtualized environment that includes a Virtual I/O Server (VIOS) partition.

FIG. 3 is a diagram of a computer system using a virtualized environment that includes a Virtual I/O Server (VIOS) partition. Computer system 300 is shown with a number of virtual partitions (partitions 375, 376, 377, and 380). The partitions are part of a virtualized environment that is coordinated by Hypervisor 305. One of the partitions (partition 380) is a specialized partition that is a virtual I/O server (VIOS). As implied, the VIOS partition provides I/O services for the other partitions. To facilitate the VIOS handling of I/O services for the other partitions, one or more communication channels (391, 392, and 393) are established between the other partitions and the VIOS partition.

Network adapter 315 and hardware devices 320 connect to the computer system using various interfaces which are managed by Hypervisor 305. In one embodiment, when a hardware (physical) interrupt occurs at one of the hardware interfaces, the Hypervisor passes the interrupt to VIOS partition 380 for processing. As shown, network adapter 315 is used to connect the computer system to computer network 200 in order to facilitate communication between the computer system and network servers and devices 335. In another embodiment, the hardware is managed ("owned") by one of the operating systems executing in one of the partitions. In this embodiment, the I/O interrupts are delivered to the physical processors (e.g., the processors running the various partitions). In this embodiment, if the partition to which the I/O interrupt is directed is currently running on the processor at the time the interrupt occurs, the partition receives the interrupt directly. On the other hand, if another partition is currently running on the processor, the partition makes a Hypervisor call and receives a "never mind" response and the interrupt is queued in the Hypervisor for later delivery to the correct partition. Furthermore, if no partition is currently running on the processor, the Hypervisor queues the interrupt and, in some cases, wakes up the correct partition so that the correct partition can handle the interrupt.

Because of its role in handling interrupts and providing the other partitions with I/O service, VIOS partition 380 generally spends more time processing interrupts than other partitions 375, 376, and 377. However, due to CPU folding, the VIOS partition (and any other partition that spends considerable time processing hardware interrupts) may have its virtual CPUs folded (reduced). This reduction in virtual CPUs At the time a partition is created, the system administrator configures a "desired" number of virtual CPUs (vCPUs) for the partition, and assigns a certain entitled processing capacity to the partition (virtual CPU entitlement value). The Hypervisor switches vCPUs in and out of physical processors, analogous to the way an OS switches processes (or threads) in a multi-programmed environment. Thus, reducing the number of vCPUs results in less context switch overhead for the system. Over the lifetime of a partition, CPU folding could potentially kick in and reduce the number of vCPUs of the partition from the system-administrator's "desired" number to a system-determined "optimal" number. The folding algorithm is traditionally geared towards concentrating processing capacity into the fewest number of vCPUs. Reducing the number of virtual CPUs may not be the best solution for interrupt-heavy environments, such as that of VIOS partition 380. To offset the effect of CPU folding on interrupt-intensive partitions, like VIOS partition 380, the operating system uses the percentage of total processing time a partition spends in servicing interrupts as a trigger for unfolding vCPUs. In interrupt-heavy environments, this reduces interrupt service latency, especially for uncapped partitions, by keeping more computing resources readily available. Even for capped partitions, adding (unfolding) a vCPU would help reduce interrupt latency on servers with idle, and available, physical processors. Unfolding vCPUs when there are available physical processors would allow parallel processing of multiple interrupts on different physical processors, thus reducing service latency. For uncapped partitions, the further advantage is that the maximum achievable processing capacity for the partition increases when more vCPUs are added. The rationale behind using overall interrupt processing time as a trigger, rather than overall busy time, is that computational threads (which contribute to busy time, but not to the interrupt processing time) tend to have more "relaxed" response time requirements, compared to interrupts. Thus, environments that are not interrupt-bound are less likely to benefit from unfolding, and can unfold less aggressively.

Many operating systems, such as IBM's AIX™ operating system, keep a running count of the amount of time spent processing interrupts. This metric is used by the operating system to calculate the percentage of partition busy time that the partition (e.g., partitions 375, 376, 377, and 380) spent processing interrupts. When this percentage exceeds an administrator-defined (tunable) threshold, it is used as a trigger for unfolding vCPUs, provided the current number of vCPUs is less than the "desired" number of vCPUs specified during partition creation. It is rather inexpensive to calculate the time spent processing interrupts, since the operating system maintains this information as part of its normal operation.

In one embodiment, the operating system that makes the folding/unfolding decision is the operating system that is running in the Hypervisor so that the Hypervisor essentially folds/unfolds the vCPUs assigned to the partitions (e.g., partitions 375, 376, 377, and 380). In another embodiment, the operating system running in the individual partitions run the folding algorithm and are thus responsible for determining, based on the folding/unfolding decisions, how many vCPUs are assigned to their particular partition. In any case, as used herein, the term "operating system" is used to refer to the process that determines how many vCPUs are assigned to a partition, whether the operating system is running in the Hypervisor or is running in one of the particular partitions.

Because this calculation is inexpensive, the time-interval between checks can be set rather aggressively. For example, the dispatcher could calculate the time spent value every time it is called upon to dispatch a new thread, which could potentially result in this metric being updated after each interrupt is serviced. In other words, the unfolding decision based on the amount of time that a partition spends processing interrupts can be made many different points by the operating system. The decision could be made by examining the time spent value at a fixed time interval (once every 10 msec, for example), or the need to make the decision could be triggered by an event, such as the dispatcher being invoked to dispatch a new thread (or the idle thread). To avoid a ping-pong effect, the decision to fold a vCPU can be made less aggressively. In other words, the decision to unfold vCPUs based on the amount of time a partition is spending processing interrupts can be made more often than the decision to fold vCPUs based on a partitions resource (e.g., CPU) utilization.

Figure 4:
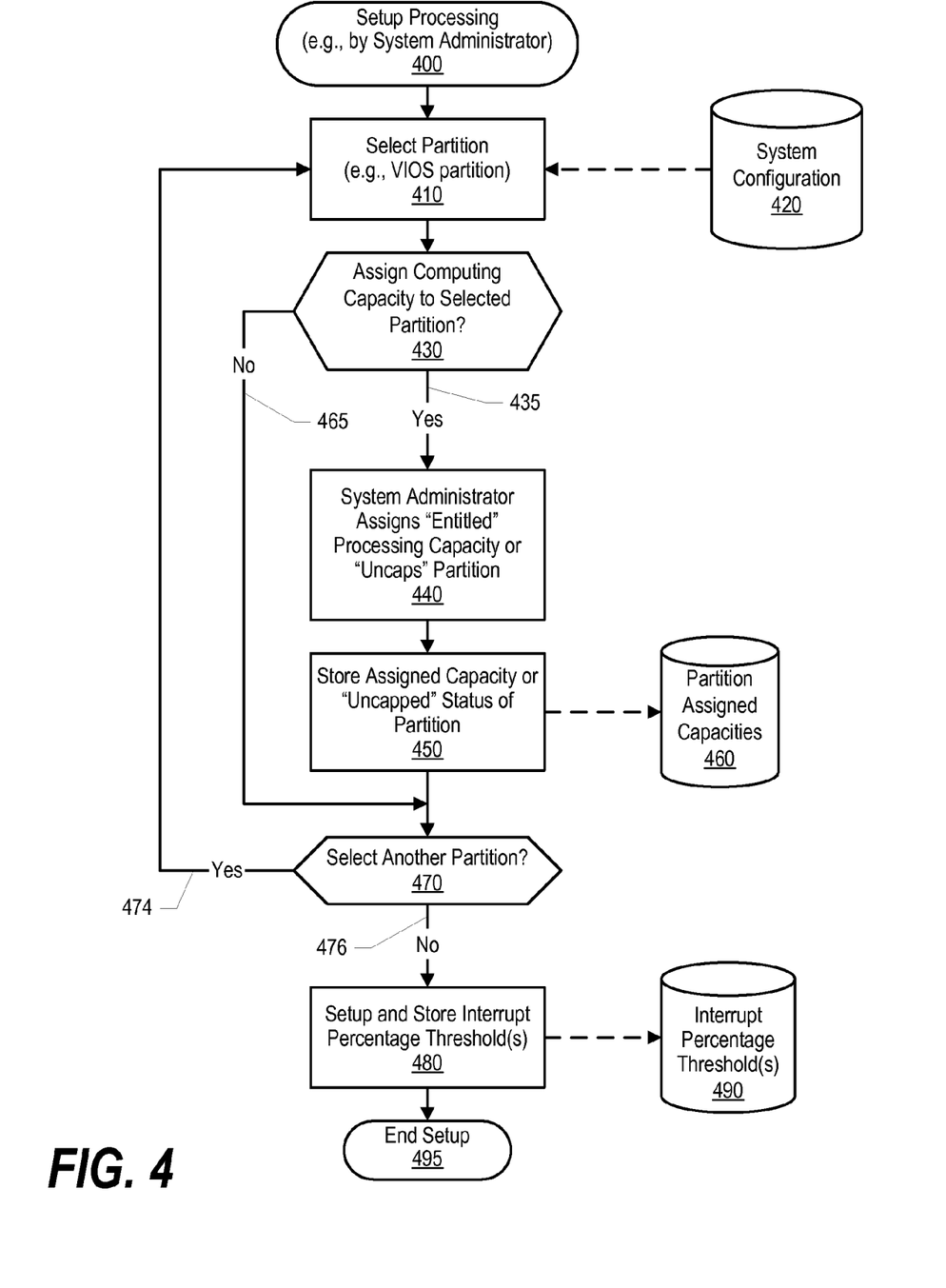
FIG. 4 is a flowchart showing setup processing performed by a system administrator to assign processing capacities and interrupt percentage thresholds to various virtual partitions.

FIG. 4 is a flowchart showing setup processing performed by a system administrator to assign processing capacities and interrupt percentage thresholds to various virtual partitions. Processing commences at 400 whereupon, at step 410, a partition that is managed by the Hypervisor in a virtualized environment is selected from system configuration data store 420. System configuration data store 420 is used to store information about the various partitions, including any Virtual I/O Server (VIOS) partition, managed by the Hypervisor. A determination is made as to whether the system administrator wishes to assign computing capacity to the selected partition (decision 430). If the system administrator chooses to assign computing capacity to the selected partition, then decision 430 branches to "yes" branch 435 whereupon, at step 440, the system administrator assigns an "entitled" processing capacity ("entitlement value") to the selected partition. In one embodiment, the system administrator can choose to "uncap" the selected partition. Uncapping a partition Uncapping a partition allows each of the partition's virtual CPUs to potentially consume up to a full physical processor's worth of processing capacity. That is, if a partition has 2 virtual CPUs, then in uncapped mode, it can consume up to (and no more than) 2 physical (real) CPUs' worth of computing capacity. At step 450, the assigned "entitlement value" is stored in nonvolatile partition assigned capacities data store 460.

Returning to decision 430, if the system administrator decides not to assign computing capacity to the selected partition, then decision 430 branches to "no" branch 465 bypassing steps 440 and 450. A determination is made as to whether the system administrator chooses to select another partition (decision 470). If the system administrator wants to select another partition, then decision 470 branches to "yes" branch 474 which loops back to select the next partition at step 410. This looping continues until the system administrator no longer wishes to select further partitions, at which point decision 470 branches to "no" branch 476.

At step 480, the system administrator sets up and stores one or more interrupt percentage thresholds. When a partition hits one of the interrupt percentage thresholds, then its vCPUs will be "unfolded" to allow the partition that is spending more time processing interrupts to have more vCPUs (up to the amount of "entitled" vCPU capacity set in step 440). In one embodiment, the interrupt percentage thresholds are set on a system-wide basis so that each partition uses the same interrupt percentage thresholds in order to "unfold" vCPUs. In another embodiment, each partition can be tuned separately to allow each partition to have different interrupt percentage thresholds as well as a default interrupt percentage threshold (in the case where an interrupt percentage threshold is not set up for a particular partition). These interrupt percentage thresholds are stored in nonvolatile interrupt percentage thresholds data store 490. Setup processing thereafter ends at 495.

Figure 5:
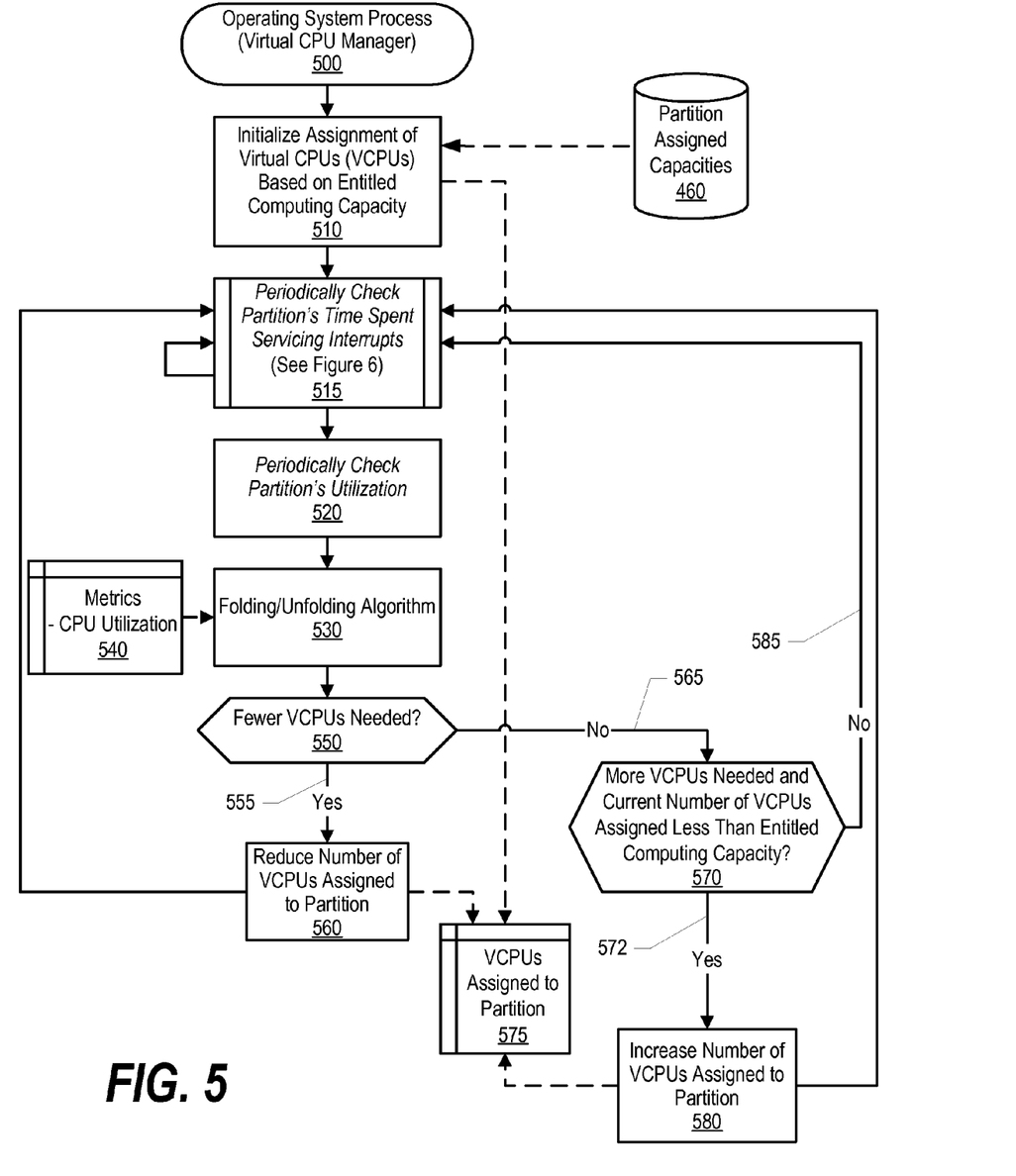
FIG. 5 is a flowchart showing steps taken by an operating system to fold/unfold virtual CPUs (vCPUs) assigned to a virtual partition.

FIG. 5 is a flowchart showing steps taken by an operating system to fold/unfold virtual CPUs (vCPUs) assigned to a virtual partition. Processing commences at 500 whereupon, at step 510, the Hypervisor initializes the assignment of virtual CPUs based on the entitlement values stored in partition assigned capacities data store 460.

Figure 6:
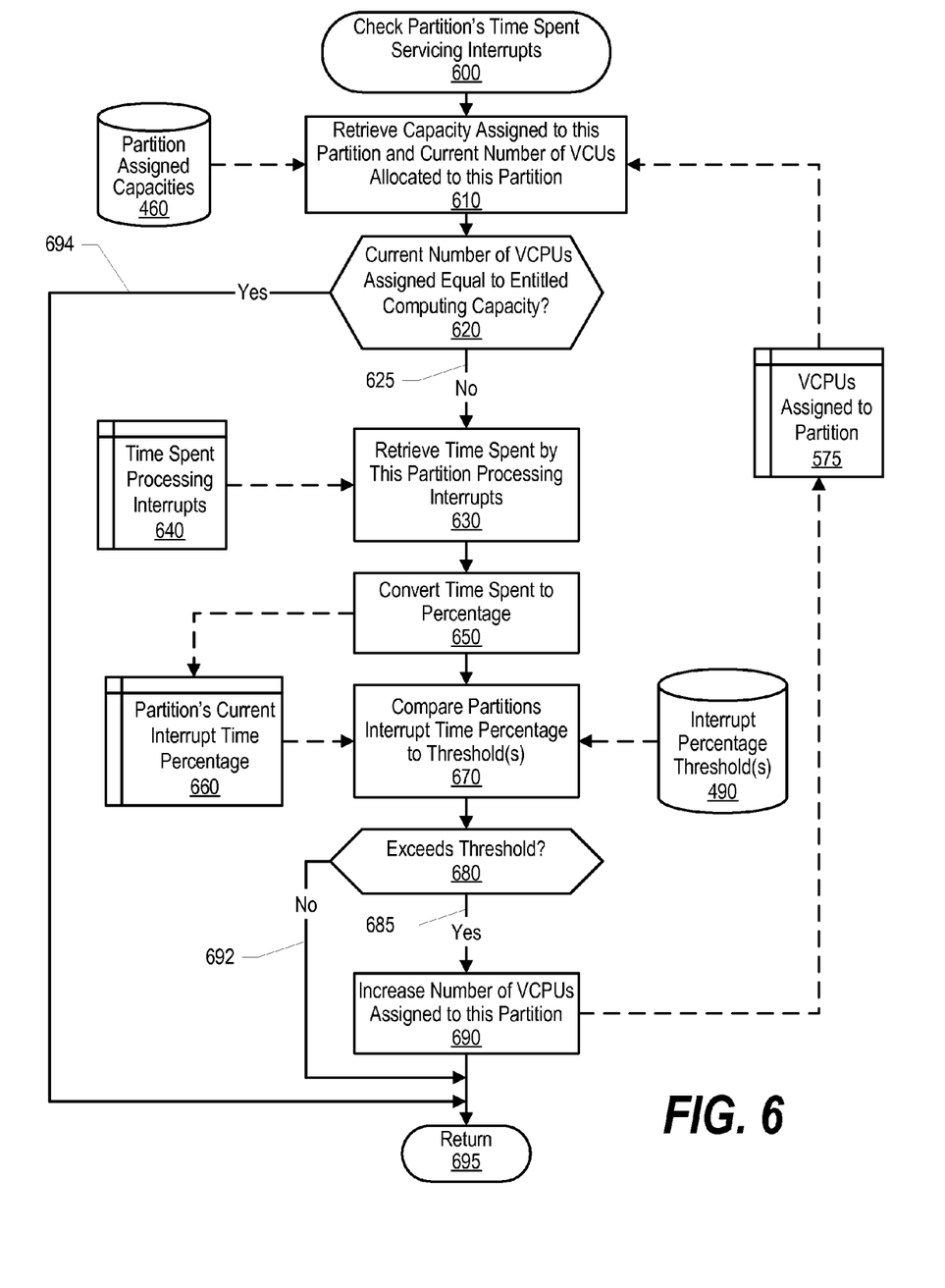
FIG. 6 is a flowchart showing steps performed by a routine executed by the operating system to analyze the amount of time a partition is spending servicing interrupts.

At predefined process 515, the operating system periodically checks the amount of time that a partition spends processing interrupts (predefined process 515, see FIG. 6 and corresponding text for processing details). As previously explained, in some systems the data used to check how much time a partition is spending processing interrupts is readily available so predefined process 515 can be performed aggressively in these environments (e.g., more often than the utilization checks used to fold vCPUs shown in steps 530 to 580).

Periodically, but not necessarily at the same time-interval that predefined process 515 is performed, the operating system checks the partition's utilization at step 520. When a partition's utilization is checked, at step 530, a virtual CPU folding/unfolding algorithm is processed using various computer system resource metrics, such as a partition's CPU utilization metric, which are retrieved from the operating system and read from memory 540. Based on the execution of the folding/unfolding algorithm, a determination is made as to whether fewer virtual CPUs are needed for the given partition (decision 550). If fewer partitions are needed, then decision 550 branches to "yes" branch 555 whereupon, at step 560, the number of virtual CPUs assigned to the partition is reduced ("folded") and this reduced value is stored in virtual CPU memory area 575 that is used when allocating virtual CPUs to partitions.

On the other hand, if fewer virtual CPUs are not needed based on the folding/unfolding algorithm, then decision 550 branches to "no" branch 565 whereupon a determination is made as to whether more virtual CPUs are needed by the partition and the current number of virtual CPUs assigned to the partition is less than the partition's "entitlement value" of virtual CPUs (decision 570). If more virtual CPUs are needed by the partition and the current number of virtual CPUs assigned to the partition is less than the partition's "entitlement value" of virtual CPUs, then decision 570 branches to "yes" branch 572 whereupon, at step 580, the number of virtual CPUs assigned to the partition is increased ("unfolded") to a value that is less than or equal to the partition's entitlement value. This increased value is stored in virtual CPU memory area 575 that is used when allocating virtual CPUs to partitions.

On the other hand, if either (a) more virtual CPUs are not needed for the partition, and/or (b) the partition is already using as many virtual CPUs as it is entitled to use (e.g., vCPUs being used=entitlement value), then decision 570 branches to "no" branch 585 bypassing step 580 and loops back to wait for the next period check of the partition's time spent servicing interrupts or the next check of the partition's system resource utilization.

FIG. 6 is a flowchart showing steps performed by a routine executed by the operating system to analyze the amount of time a partition is spending servicing interrupts. Processing commences at 600 whereupon, at step 610, the "entitlement value" of virtual CPUs that have been assigned to this partition are retrieved from partition assigned capacities data store 460. A determination is made as to whether the current number of virtual CPUs assigned to this partition is equal to the entitled value of virtual CPUs assigned to this partition (decision 620). If the current number of virtual CPUs assigned to this partition is not equal to the partition's entitlement value (e.g., the current number is less than the entitlement value), then decision 620 branches to "no" branch 625 in order to determine if additional virtual CPUs should be assigned to this partition based on the amount of time that the partition is spending processing interrupts.

At step 630, the amount of time spent by this partition processing interrupts is retrieved from memory area 640 which is a counter maintained by the operating system of the amount of time (e.g., processor cycles, actual CPU time, etc.)

that this partition has spent processing interrupts. At step 650, the amount of time value is converted to a percentage value (the percentage of the partition's time that the partition is spending processing interrupts). This calculated percentage is stored in memory are 660. At step 670, the partition's current interrupt time percentage value is compared to the time percentage thresholds that were established by the system administrator and stored in data store 490. A determination is made, based on the comparison, as to whether the partition's current interrupt time percentage exceeds a threshold (decision 680). If the partition's current interrupt time percentage exceeds a threshold, then decision 680 branches to "yes" branch 685 whereupon, at step 690, the number of virtual CPUs assigned to the partition is increased ("unfolded") to a value that is less than or equal to the partition's entitlement value. This increased value is stored in virtual CPU memory area 575 that is used when allocating virtual CPUs to partitions. On the other hand, if the partition's current interrupt time percentage does not exceed a threshold, then decision 680 branches to "no" branch 692 bypassing step 690. Processing thereafter returns to the calling routine (see FIG. 5) at 695.

Returning to decision 620, if the current number of virtual CPUs assigned to this partition is equal to the partition's entitlement value (e.g., the current number of virtual CPUs is equal the entitlement value), then decision 620 branches to "yes" branch 694 bypassing steps 630 to 690. Processing thereafter returns to the calling routine (see FIG. 5) at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a computer system, said method comprising:
   selecting a partition from a plurality of partitions included in a virtualized environment running on the computer system;
   periodically checking one or more resource utilizations of the selected partition on a first time-interval basis, wherein the checking includes executing a folding algorithm to alter the number of virtual CPUs assigned to the selected partition based on the resource utilization;
   on a second time-interval basis that is less than the first time-interval basis:
      retrieving a time spent value corresponding to a selected partition that is selected from a plurality of partitions included in a virtualized environment running on the computer system, wherein the time spent value corresponds to an amount of time the selected partition has spent processing interrupts and a number of virtual CPUs are assigned to the selected partition;
      comparing the time spent value to one or more interrupt thresholds; and
      increasing the number of virtual CPUs that are assigned to the selected partition in response to the comparison revealing that the time spent value is greater than one of the interrupt thresholds.

2. The method of claim 1 wherein one of the resource utilizations is a CPU utilization value.

3. The method of claim 1 further comprising:
   prior to the increasing step, retrieving a virtual CPU entitlement value corresponding to the selected partition and a current number of virtual CPUs allocated to the selected partition, wherein the increasing step is only performed in response to the current number of virtual CPUs being less than the virtual CPU entitlement value.

4. The method of claim 3 further comprising:
   prior to the retrieval of the time spent value, assigning the virtual CPU entitlement value to the selected partition during a setup process; and
   storing the virtual CPU entitlement value in a nonvolatile storage area, wherein the retrieval of the virtual CPU entitlement value retrieves the virtual CPU entitlement value from the nonvolatile storage area.

5. The method of claim 1 further comprising:
   converting the time spent value to a percentage value, wherein the percentage value represents a percentage of time spent by the selected partition in handling interrupts, wherein the interrupt thresholds include one or more threshold percentages, and wherein the comparing compares the percentage value to the threshold percentages.

6. The method of claim 1 further comprising:
   prior to the retrieval of the time spent value, receiving the one or more interrupt threshold percentages from a user; and
   storing the received interrupt threshold percentages in a nonvolatile storage area, wherein the stored interrupt threshold percentages are retrieved from the nonvolatile storage area prior to the comparison of the time spent value to the interrupt thresholds.

7. An information handling system comprising:
one or more processors (CPUs);
a memory accessible by at least one of the CPUs;
a nonvolatile storage device accessible by at least one of the CPUs;
a Hypervisor application that is loaded in the memory and executed by at least one of the CPUs to provide a virtualized environment, wherein a plurality of partitions are included in the virtualized environment, wherein an operating system executes in one or more of the partitions;
one or more data stores stored on the nonvolatile storage device, wherein the data stores store one or more interrupt thresholds and one or more virtual CPU entitlement values that correspond to the one or more partitions;
a set of instructions which are loaded into the memory and executed by a selected one of the operating systems in order to perform actions of:
 selecting a partition from a plurality of partitions included in a virtualized environment running on the computer system;
 periodically checking one or more resource utilizations of the selected partition on a first time-interval basis, wherein the checking includes executing a folding algorithm to alter the number of virtual CPUs assigned to the selected partition based on the resource utilization;
 on a second time-interval basis that is less than the first time-interval basis:
  retrieving a time spent value corresponding to a selected partition that is selected from the plurality of partitions included in the virtualized environment, wherein the time spent value corresponds to an amount of time the selected partition has spent processing interrupts and wherein a number of virtual CPUs are assigned to the selected partition;
  retrieving the interrupt thresholds stored in the data store;
  comparing the time spent value to the retrieved interrupt thresholds; and
  increasing the number of virtual CPUs that are assigned to the selected partition in response to the comparison revealing that the time spent value is greater than one of the interrupt thresholds.

8. The information handling system of claim 7 wherein the set of instructions executed by the selected operating system perform additional actions comprising:
prior to the increasing step, retrieving a virtual CPU entitlement value corresponding to the selected partition and a current number of virtual CPUs allocated to the selected partition, wherein the increasing step is only performed in response to the current number of virtual CPUs being less than the virtual CPU entitlement value.

9. The information handling system of claim 8 wherein the set of instructions executed by the selected operating system perform additional actions comprising:
prior to the retrieval of the time spent value, assigning the virtual CPU entitlement value to the selected partition during a setup process; and
storing the virtual CPU entitlement value in a nonvolatile storage area, wherein the retrieval of the virtual CPU entitlement value retrieves the virtual CPU entitlement value from the nonvolatile storage area.

10. The information handling system of claim 7 wherein the set of instructions executed by the selected operating system perform additional actions comprising:
converting the time spent value to a percentage value, wherein the percentage value represents a percentage of time spent by the selected partition in handling interrupts, wherein the interrupt thresholds include one or more threshold percentages, and wherein the comparing compares the percentage value to the threshold percentages.

11. The information handling system of claim 7 wherein the set of instructions executed by the selected operating system perform additional actions comprising:
prior to the retrieval of the time spent value, receiving the one or more interrupt threshold percentages from a user; and
storing the received interrupt threshold percentages in one of the data stores on the nonvolatile storage device.

12. A computer program product stored in a non-transitory computer readable medium, comprising functional descriptive material that, when executed by an information handling system, causes the information handling system to perform actions that include:
 selecting a partition from a plurality of partitions included in a virtualized environment running on the computer system;
 periodically checking one or more resource utilizations of the selected partition on a first time-interval basis, wherein the checking includes executing a folding algorithm to alter the number of virtual CPUs assigned to the selected partition based on the resource utilization;
 on a second time-interval basis that is less than the first time-interval basis:
  retrieving a time spent value corresponding to a selected partition that is selected from a plurality of partitions included in a virtualized environment running on the computer system, wherein the time spent value corresponds to an amount of time the selected partition has spent processing interrupts and a number of virtual CPUs are assigned to the selected partition;
  comparing the time spent value to one or more interrupt thresholds; and
  increasing the number of virtual CPUs that are assigned to the selected partition in response to the comparison revealing that the time spent value is greater than one of the interrupt thresholds.

13. The computer program product of claim 12 wherein one of the resource utilizations is a CPU utilization value.

14. The computer program product of claim 12 further comprising functional descriptive material that causes the information handling system to perform additional actions that include:
prior to the increasing step, retrieving a virtual CPU entitlement value corresponding to the selected partition and a current number of virtual CPUs allocated to the selected partition, wherein the increasing step is only performed in response to the current number of virtual CPUs being less than the virtual CPU entitlement value.

15. The computer program product of claim 14 further comprising functional descriptive material that causes the information handling system to perform additional actions that include:
prior to the retrieval of the time spent value, assigning the virtual CPU entitlement value to the selected partition during a setup process; and
storing the virtual CPU entitlement value in a nonvolatile storage area, wherein the retrieval of the virtual CPU entitlement value retrieves the virtual CPU entitlement value from the nonvolatile storage area.

16. The method of claim 1 further comprising functional descriptive material that causes the information handling system to perform additional actions that include:

converting the time spent value to a percentage value, wherein the percentage value represents a percentage of time spent by the selected partition in handling interrupts, wherein the interrupt thresholds include one or more threshold percentages, and wherein the comparing compares the percentage value to the threshold percentages.

17. The method of claim 1 further comprising functional descriptive material that causes the information handling system to perform additional actions that include:

prior to the retrieval of the time spent value, receiving the one or more interrupt threshold percentages from a user; and storing the received interrupt threshold percentages in a nonvolatile storage area, wherein the stored interrupt threshold percentages are retrieved from the nonvolatile storage area prior to the comparison of the time spent value to the interrupt thresholds.

* * * * *